(12) United States Patent
Chang et al.

(10) Patent No.: US 10,313,548 B2
(45) Date of Patent: Jun. 4, 2019

(54) IMAGE SCANNING METHOD (71) Applicant: Foxlink Image Technology Co., Ltd., New Taipei (TW)

(72) Inventors: Yao Shuo Chang, New Taipei (TW); Yi Hsuan Lin, New Taipei (TW); Jui Yi Yu, New Taipei (TW); Te Yu Chu, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 15/857,638

(22) Filed: Dec. 29, 2017

(65) Prior Publication Data

US 2018/0278790 A1 Sep. 27, 2018

(30) Foreign Application Priority Data

Mar. 23, 2017 (TW) .............................. 106109828 A (51) Int. Cl.
*H04N 1/107* (2006.01)
*H04N 1/047* (2006.01)
*H04N 1/00* (2006.01)

(52) U.S. Cl.
CPC ....... *H04N 1/1078* (2013.01); *H04N 1/00018* (2013.01); *H04N 1/00053* (2013.01); *H04N 1/047* (2013.01)

(58) Field of Classification Search
CPC .. H04N 1/1078; H04N 1/047; H04N 1/00018; H04N 1/00053; H04N 1/00525; H04N 1/00559; H04N 1/121; H04N 1/04; H04N 2201/0081
See application file for complete search history.

(56) References Cited

U.S. PATENT DOCUMENTS 4,724,330 A * 2/1988 Tuhro ................ H04N 1/00002
250/208.3
2004/0119005 A1* 6/2004 Krohn ................ H04N 1/00002
250/239

* cited by examiner

*Primary Examiner* — Iriana Cruz
(74) *Attorney, Agent, or Firm* — Lin & Associates Intellectual Property, Inc.

(57) ABSTRACT

An image scanning method applied in an image scanning device capable of scanning a card. Record background values at the time of a card being without being in a scanning channel, and the background values recorded at the time of the card being without being in the scanning channel are regarded as preset values. Before the card is scanned, check whether the background values in the scanning channel conform to the preset values. Drive the card to move a distance Y. Check whether the background values in the scanning channel conform to the preset values. Preset a preset movement distance, check whether a movement distance of the card or a distance of accumulated movements of the card exceeds the preset movement distance. Display that the card is stuck. Stop checking and proceeding an image calibration. Start scanning the card. Complete scanning the card and withdraw the card.

8 Claims, 13 Drawing Sheets

ed form, Taiwan Patent Application No. 106109828, filed Mar.
IMAGE SCANNING METHOD

CROSS-REFERENCE TO RELATED APPLICATION

The present application is based on, and claims priority form, Taiwan Patent Application No. 106109828, filed Mar. 23, 2017, the disclosure of which is hereby incorporated by reference herein in its entirety.

BACKGROUND OF THE INVENTION

1. Field of the Invention

The present invention generally relates to an image scanning method applied in an image scanning device, and more particularly to an image scanning method applied in an image scanning device to make the image scanning device have a lower manufacturing cost and better scanning quality.

2. The Related Art

Referring to FIG. 10 to FIG. 13, a first current image scanning device 100' capable of scanning a card 200', includes a base 10', an upper cover 20' covered to the base 10', a first roller 11', a second roller 12', a lower image sensing element 13', an upper image sensing element 21' and a motor (not shown). The upper cover 20' opens an upper recess 22' penetrating through a middle of a bottom surface of the upper cover 20' and extending transversely. The base 10' opens a lower recess 14' penetrating through a middle of a top surface of the base 10' and extending transversely. The upper image sensing element 21' and the lower image sensing element 13' are assembled in the upper recess 22' and the lower recess 14', respectively and disposed opposite to each other. After the upper cover 20' is covered to the base 10', a scanning channel 40' is formed between the upper image sensing element 21' and the lower image sensing element 13', a first passageway 30' is formed between the upper cover 20' and the base 10' and located in front of the scanning channel 40', and a second passageway 50' is formed between the upper cover 20' and the base 10', and located behind the scanning channel 40' and communicated with an outside.

The first roller 11' is mounted to the base 10' and projects into the first passageway 30'. The second roller 12' is mounted to the base 10' and projects into the second passageway 50'. The first roller 11' and the second roller 12' are connected with the motor and are driven by the motor to be capable of rotating clockwise and anticlockwise. The first passageway 30', the scanning channel 40' and the second passageway 50' are communicated with one another, a first sensor 60' is disposed in the first passageway 30', a second sensor 70' is disposed in the second passageway 50' and located in front of a center line 121' of the second roller 12', the scanning channel 40' has a scanning read line 41', the first sensor 60' is used for detecting whether the card 200' to be scanned is in the first passageway 30'. The second sensor 70' is used for detecting an original position of the card 200' to be scanned.

A first image scanning method of the first current image scanning device 100' is described as follows. The card 200' is inserted into the first passageway 30'. After the first sensor 60' detects the card 200' is in the first passageway 30', the first roller 11' and the second roller 12' rotate clockwise to feed the card 200' backward, the card 200' passes through the scanning channel 40' until a rear edge of card 200' arrives to the second passageway 50'. The rear edge of the card 200' is located between the center line 121' of the second roller 12' and the second sensor 70'. The rear edge of the card 200' keeps a distance from the scanning read line 41'. The first roller 11' and the second roller 12' stop rotating clockwise and stop feeding the card 200' backward, at the moment, the card 200' is located at a stop position. After a preset time, the first roller 11' and the second roller 12' rotate anticlockwise to feed the card 200' forward, after the card 200' touches the second sensor 70', the first current image scanning device 100' proceeds scanning the card 200', and the first current image scanning device 100' continues feeding the card 200' forward until a completion of scanning the card 200'. After the completion of scanning the card 200', the card 200' is fed out from the first passageway 30'.

However, when the card 200' is fed backward, the card 200' is easily caused to be skewed that makes a part of the card 200' shield the scanning read line 41' before the card 200' is scanned, namely at the time of the card 200' being located at the stop position. In addition, when the card 200' is located at the stop position, the card 200' is caused to shield the scanning read line 41' also probably on account of the second roller 12' slipping that makes the card 200' be partly without being scanned in the scanning process, so the card 200' is scanned incompletely that makes the first current image scanning device 100' applying the first image scanning method have worse scanning quality. Furthermore, the first current image scanning device 100' applying the first image scanning method has a higher manufacturing cost on account of the first current image scanning device 100' needing to be equipped with two sensors which are the first sensor 60' and the second sensor 70'.

Figure 10:
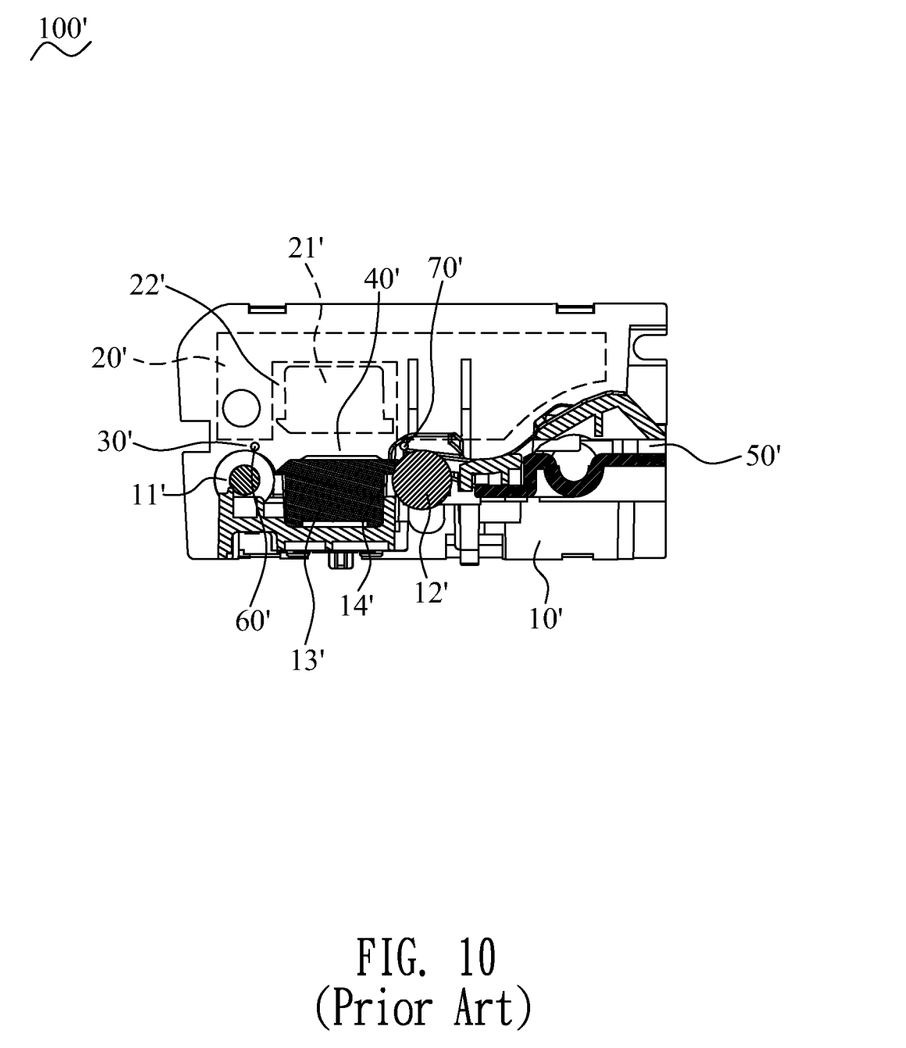
FIG. 10 is a cross-sectional diagrammatic drawing of a first current image scanning device in prior art.
Figure 11:
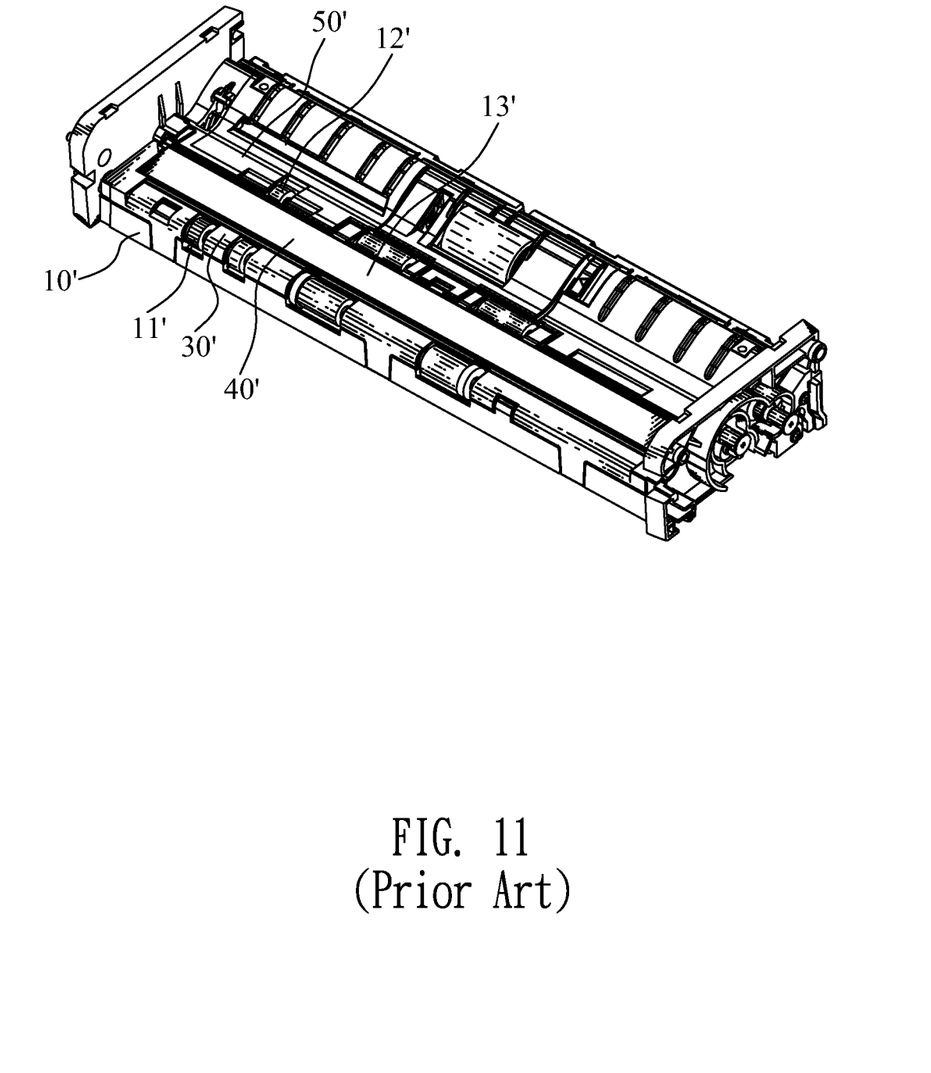
FIG. 11 is a perspective view of the first current image scanning device of FIG. 10, wherein an upper cover is omitted.
Figure 12:
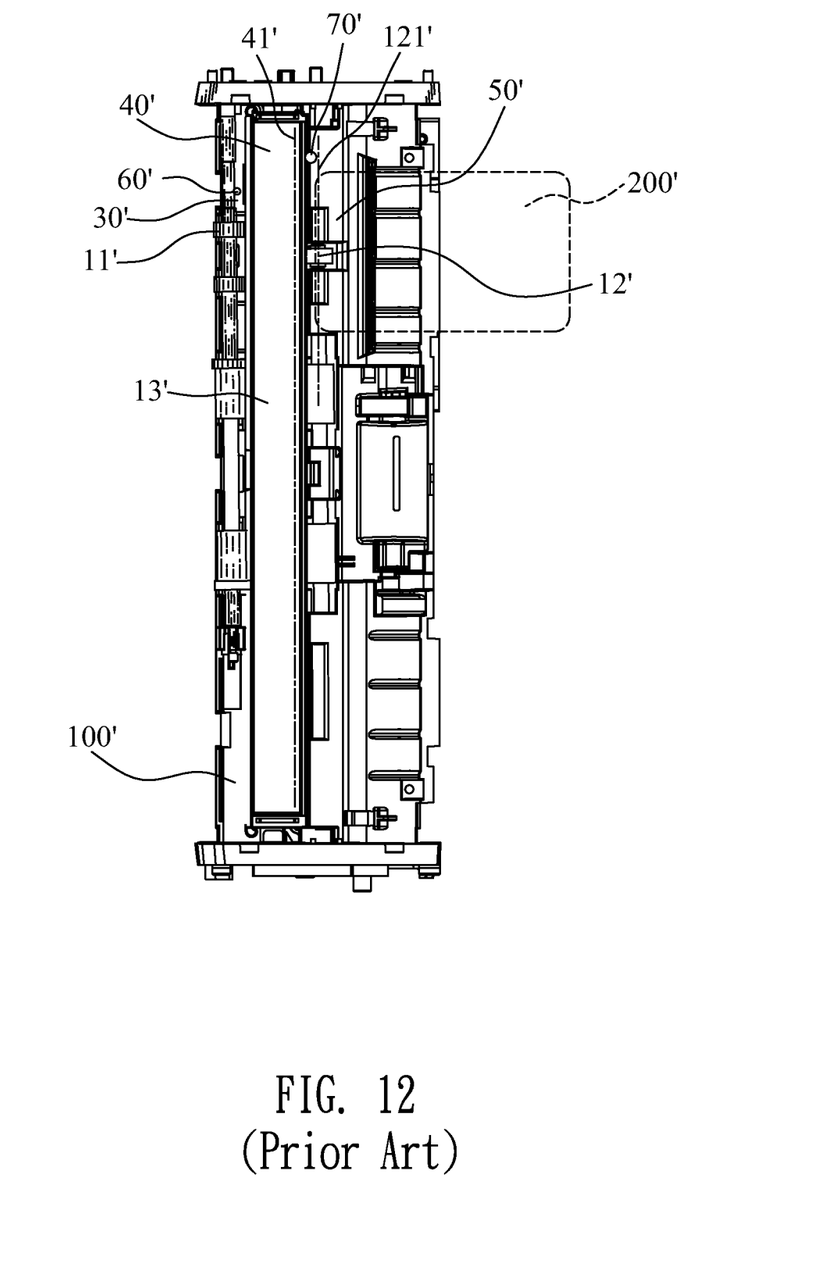
FIG. 12 is a diagrammatic drawing of the first current image scanning device of FIG. 11, wherein the card is remained in a second passageway before the first current image scanning device scans the card.
Figure 13:
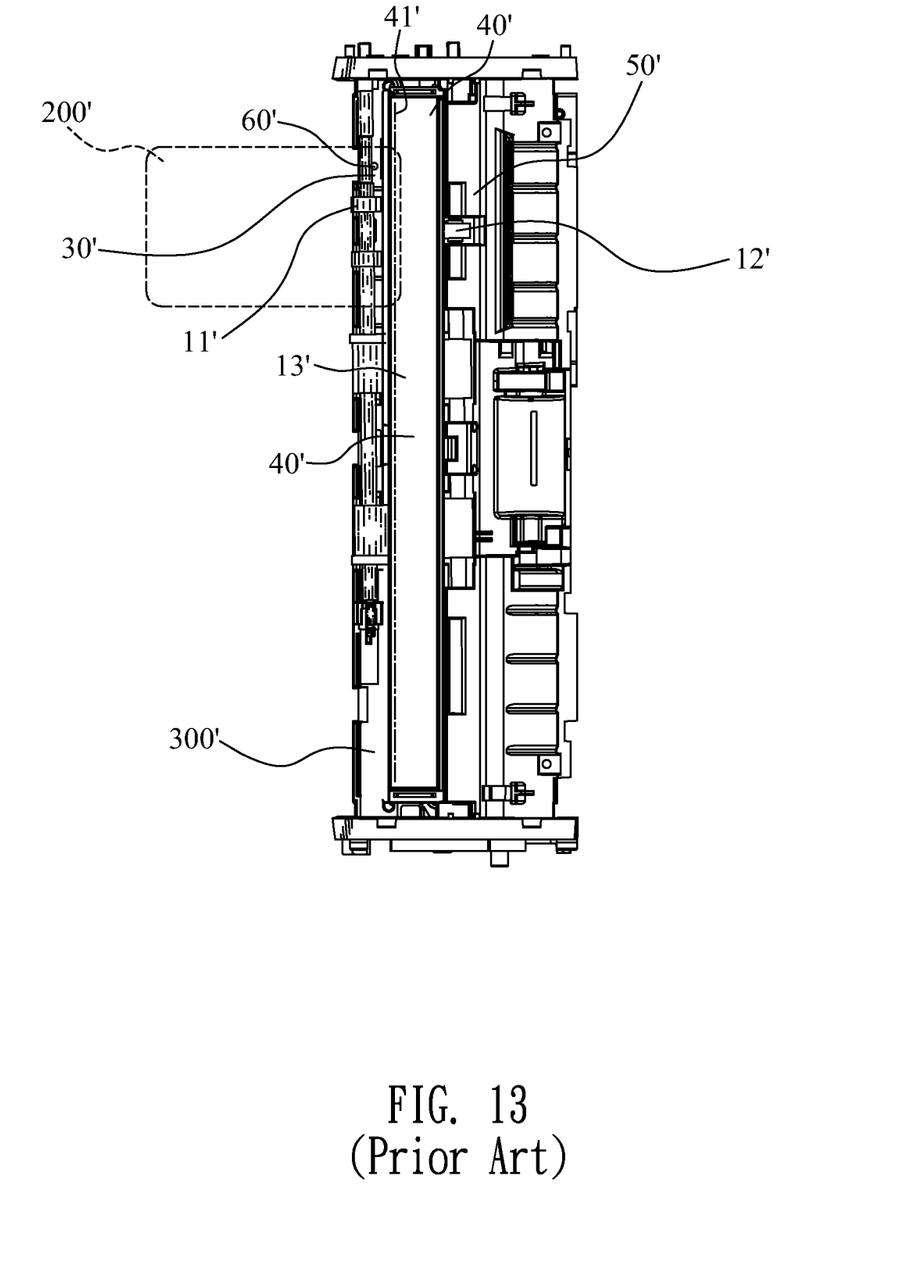
FIG. 13 is a diagrammatic drawing of a second current image scanning device in prior art, wherein the card is inserted into the second current image scanning device before the second current image scanning device prepares to scan the card.

Referring to FIG. 10 to FIG. 13 again, a second image scanning method of a second current image scanning device 300' for scanning the card 200' is described as follows. The card 200' is fed into the second current image scanning device 300' through the first passageway 30', after the card 200' is scanned in the scanning channel 40', the card 200' is fed out from the second passageway 50', and the second current image scanning device 300' just needs the first sensor 60' in the first passageway 30', and has no need of disposing the second sensor 70' in the second passageway 50', when the card 200' is inserted into the first passageway 30', the first sensor 60' senses that the card 200' is fed into the second current image scanning device 300', the second current image scanning device 300' starts scanning the card 200'. When the card 200' is inserted into the second current image scanning device 300', a front end of the card 200' is apt to project beyond the scanning read line 41', so that when the second current image scanning device 300' is scanning the card 200', the card 200' is scanned incompletely on account of the front end of the card 200' projecting beyond the scanning read line 41' being without being scanned. As a result, the second current image scanning device 300' applying the second image scanning method has worse scanning quality.

Thus, in order to solve the above-mentioned problems, an improved image scanning method applied in an image scanning device is essential to be provided to make the image scanning device have a lower manufacturing cost and better scanning quality.

SUMMARY OF THE INVENTION

An object of the present invention is to provide an image scanning method applied in an image scanning device capable of scanning a card. The image scanning device includes two groups of rollers capable of rotating clockwise and anticlockwise, a lower image sensing element, and an upper image sensing element opposite to the lower image sensing element. A scanning channel is formed between the upper image sensing element and the lower image sensing element. Specific steps of the image scanning method are described hereinafter. Record background values at the time of the card being without being in the scanning channel, and the background values recorded at the time of the card being without being in the scanning channel are regarded as preset values to be a standard range. Before the card is scanned, check whether the background values in the scanning channel conform to the preset values by virtue of the upper image sensing element and the lower image sensing element, if the background values in the scanning channel conform to the preset values, execute step five, if the background values in the scanning channel are discrepant with the preset values, execute step three. Drive the card to move a distance Y by virtue of the two groups of the rollers rotating, execute step four. Check whether the background values in the scanning channel conform to the preset values by virtue of the upper image sensing element and the lower image sensing element, if the background values in the scanning channel conform to the preset values, that the card has been taken away from the scanning channel is denoted, and execute step seven, if the background values in the scanning channel are discrepant with the preset values, execute step five. Preset a preset movement distance, check whether a movement distance of the card or a distance of accumulated movements of the card exceeds the preset movement distance, if the distance of the accumulated movements of the card is without exceeding the preset movement distance, execute step three again, if the distance of the accumulated movements of the card exceed the preset movement distance, execute step six. Display that the card is stuck. Stop checking and proceeding an image calibration, and execute step eight. Start scanning the card until the card is completed being scanned, execute step nine. Complete scanning the card and withdraw the card from the image scanning device.

As described above, the image scanning device applying the image scanning method checks whether the background values in the scanning channel conform to the preset values by virtue of the upper image sensing element and the lower image sensing element, namely the image scanning device applying the image scanning method checks whether the card is in the scanning channel, when the card is in the scanning channel, signals are sent to the at least one motor, and the at least one motor controls the two groups of rollers to rotate to drive the card away from the scanning channel, so that the card is ensured to be incapable of projecting into the scanning channel, and the card never shields the scanning read line, the card is scanned completely and scanning quality of the image scanning device applying the image scanning method to scan the card is better. Furthermore, the image scanning device just needs the single card sensing element, comparing with the first current image scanning device and the second current image scanning device in prior art, the image scanning device applying the image scanning method has a lower manufacturing cost and better scanning quality.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
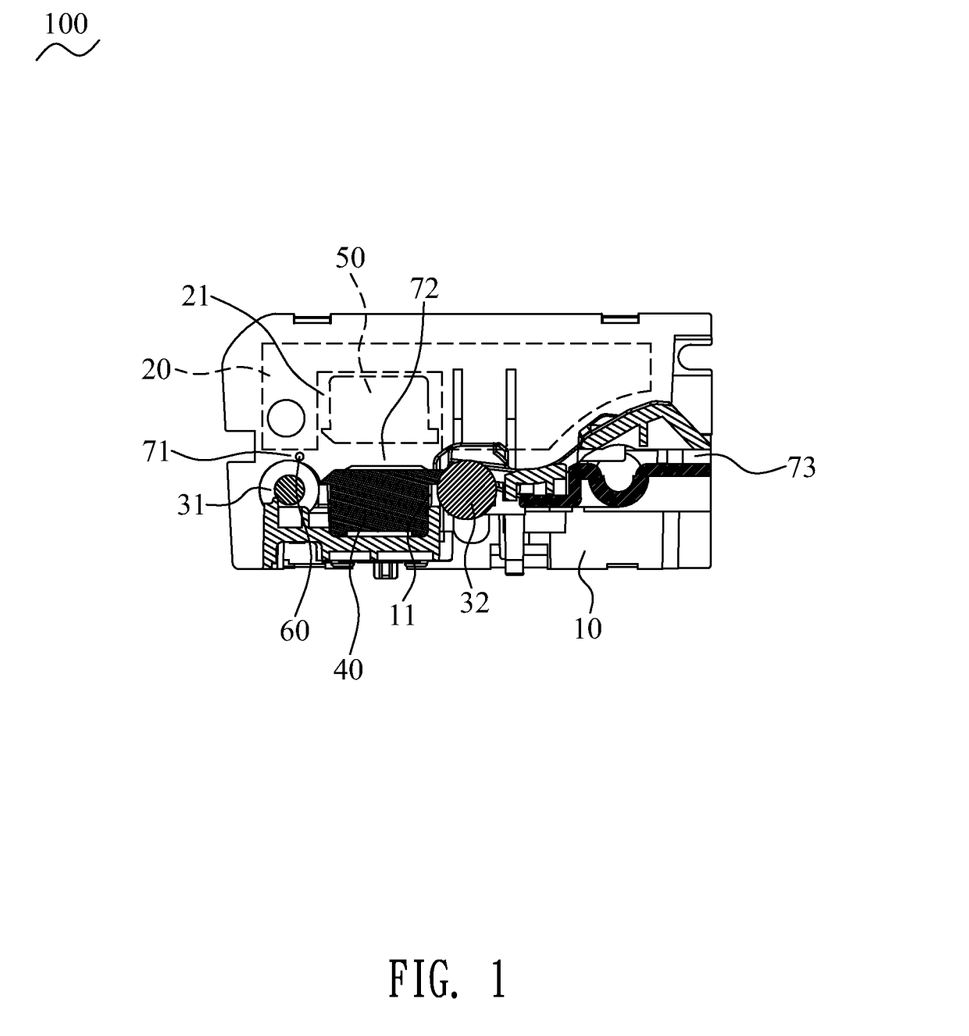
FIG. 1 is a cross-sectional diagrammatic drawing of an image scanning device in accordance with a first preferred embodiment of the present invention.
Figure 2:
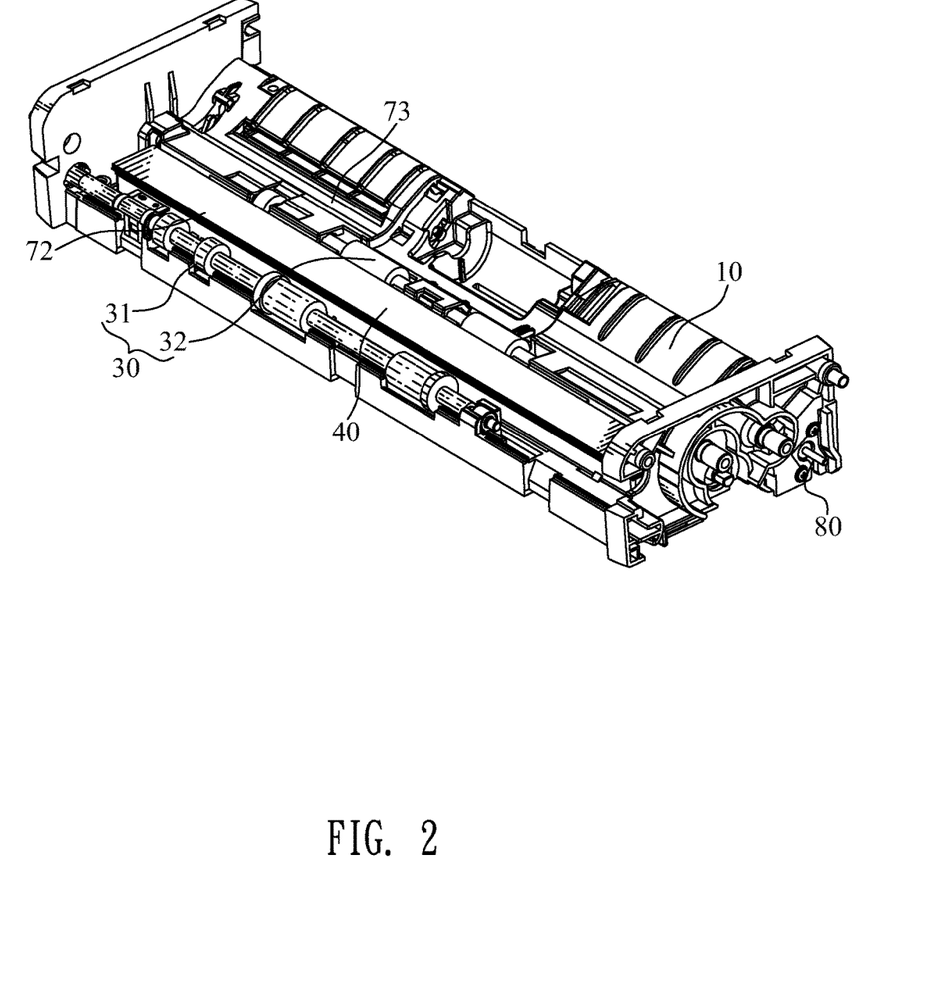
FIG. 2 is a perspective view of the image scanning device of FIG. 1, wherein an upper cover is omitted.

With reference to FIG. 1 and FIG. 2, an image scanning method applied in an image scanning device 100 in accordance with the present invention is shown. The image scanning device 100 is capable of scanning a card 200. The image scanning device 100 includes a base 10, an upper cover 20 pivotally covered to the base 10, two groups of rollers 30, a lower image sensing element 40, an upper image sensing element 50, a card sensing element 60, and at least one motor 80 mounted to the base 10.

Figure 3:
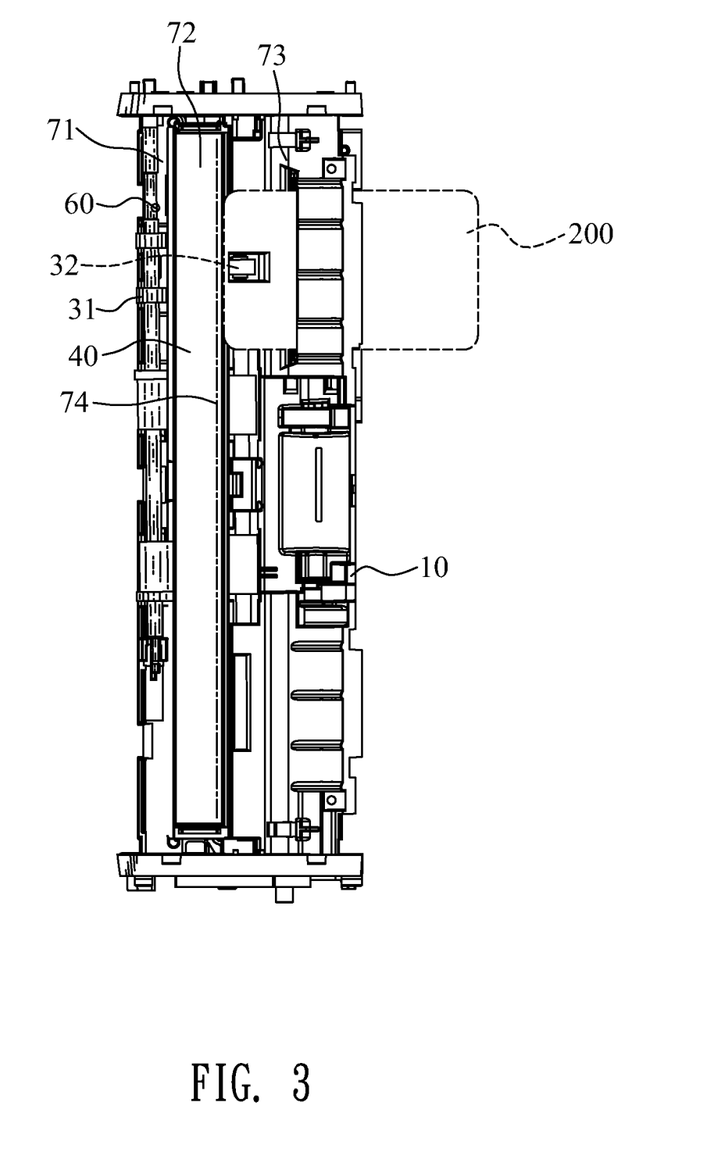
FIG. 3 is a diagrammatic drawing of the image scanning device of FIG. 1, wherein a card is remained in a second passageway before the image scanning device scans the card.

Referring to FIG. 1 to FIG. 3, the base 10 opens a lower recess 11 penetrating through a middle of a top surface of the base 10 and extending transversely. The upper cover 20 opens an upper recess 21 penetrating through a middle of a bottom surface of the upper cover 20 and extending transversely. The upper recess 21 is corresponding to the lower recess 11. The lower image sensing element 40 is disposed in the lower recess 11. The upper image sensing element 50 is disposed in the upper recess 21 and opposite to the lower image sensing element 40. After the upper cover 20 is covered to the base 10, a scanning channel 72 is formed between the upper image sensing element 50 and the lower image sensing element 40, a first passageway 71 is formed between the upper cover 20 and the base 10 and is located in front of the scanning channel 72, and a second passageway 73 is formed between the upper cover 20 and the base 10, and the second passageway 73 is located behind the scanning channel 72 and communicated with an outside.

One group of the rollers 30 are mounted to the base 10 and project into the first passageway 71. The other group of the rollers 30 are mounted to the base 10 and project into the second passageway 73. The two groups of the rollers 30 are connected with and driven by the at least one motor 80 to be capable of rotating clockwise and anticlockwise. The one group of the rollers 30 mounted to the base 10 and projecting into the first passageway 71 are defined as first rollers 31. The other group of the rollers 30 mounted to the base 10 and projecting into the second passageway 73 are defined as second rollers 32. The first passageway 71, the scanning channel 72 and the second passageway 73 are communicated with one another. The card sensing element 60 is mounted in the first passageway 71. A scanning read line 74 is disposed in the scanning channel 72. The card sensing element 60 is used for detecting whether the card 200 to be scanned is in the first passageway 71.

Referring to FIG. 3 again, the image scanning device 100 in accordance with a first preferred embodiment of the present invention is shown. In the first preferred embodiment, the card 200 is inserted into the image scanning device 100 through the first passageway 71. The first rollers 31 and the second rollers 32 rotate clockwise to drive the card 200 to pass through the scanning channel 72 to enter the second passageway 73 until a rear end of the card 200 enters the second passageway 73. The rear end of the card 200 keeps a certain distance from the scanning read line 74, and then the first rollers 31 and the second rollers 32 rotate anticlockwise to drive the card 200 to pass through the second passageway 73 to be scanned and the card 200 is fed out from the first passageway 71.

Figure 4:
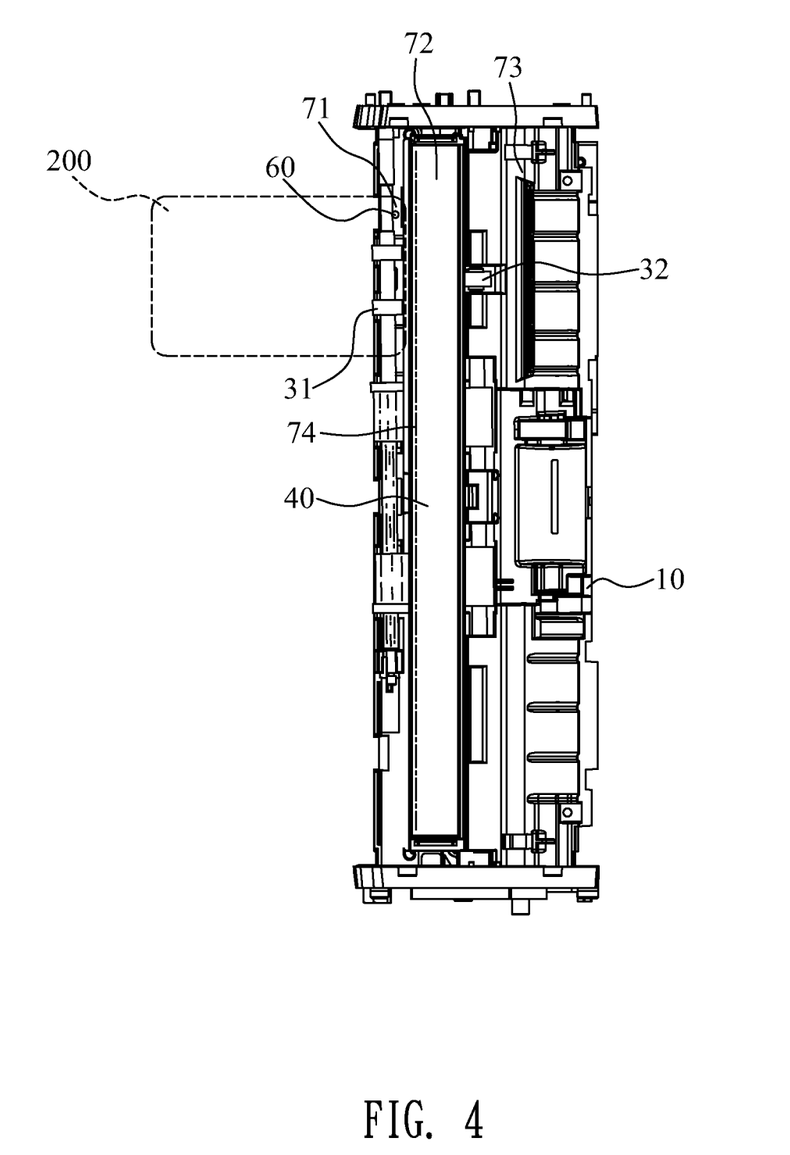
FIG. 4 is a diagrammatic drawing of the image scanning device in accordance with a second preferred embodiment of the present invention, wherein the card is inserted into the image scanning device before the image scanning device prepares to scan the card.

Referring to FIG. 4, the image scanning device 100 in accordance with a second preferred embodiment of the present invention is shown. In the second preferred embodiment, the card 200 enters the image scanning device 100 in accordance with the second preferred embodiment of the present invention through the first passageway 71. The first rollers 31 and the second rollers 32 rotate clockwise to drive the card 200 to pass through the scanning channel 72 to be scanned and the card 200 is fed out from the second passageway 73.

Figure 5:
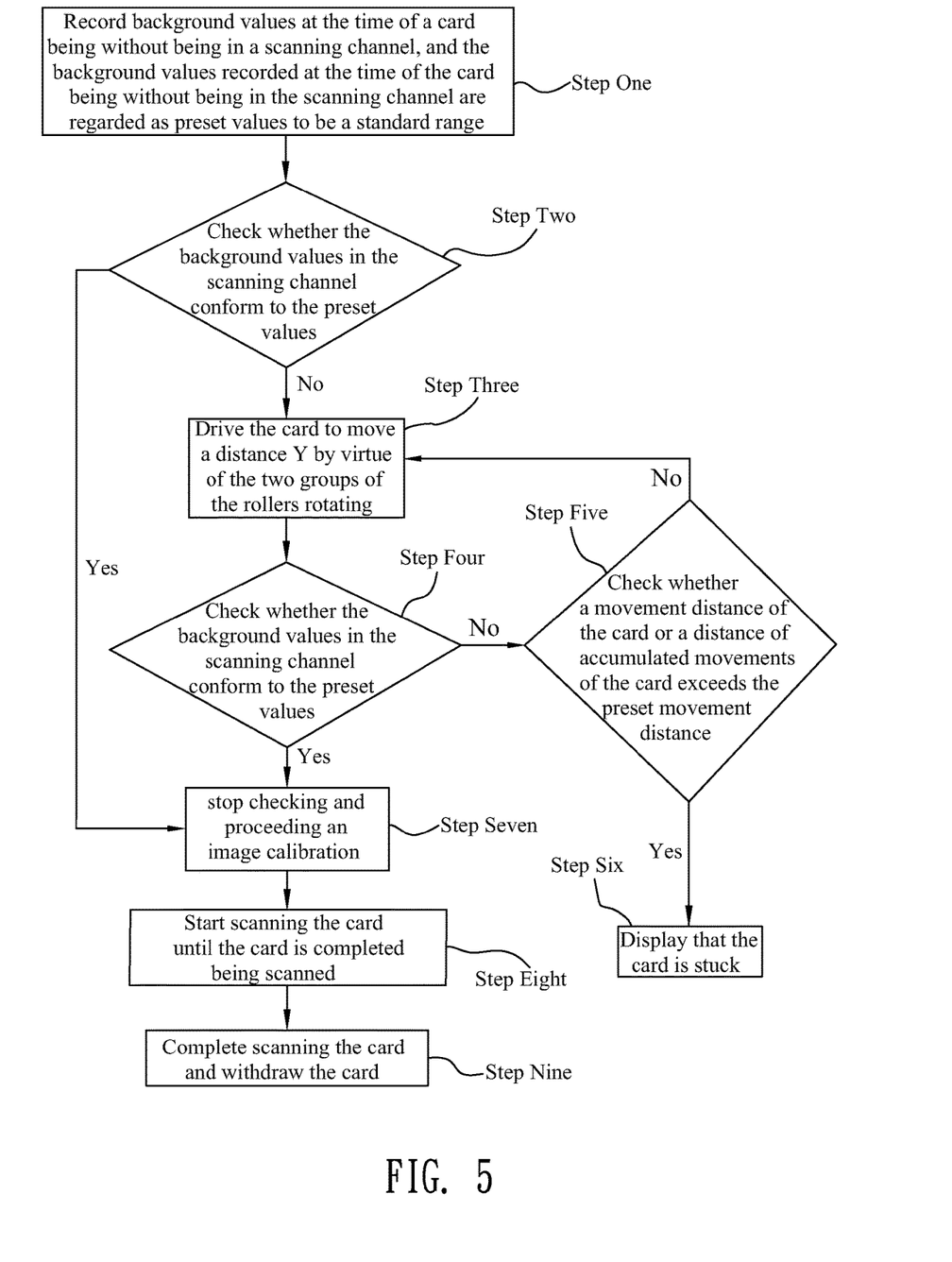
FIG. 5 is a flow diagram of an image scanning method applied in the image scanning device in accordance with the present invention, wherein the image scanning device applying the image scanning method proceeds scanning the card.

Referring to FIG. 1, FIG. 3 and FIG. 5, the image scanning method is applied in the image scanning device 100 for scanning the card 200. Specific steps of the image scanning method are described as follows.

Step one: record background values at the time of the card 200 being without being in the scanning channel 72, and the background values recorded at the time of the card 200 being without being in the scanning channel 72 are regarded as preset values to be a standard range.

Step two: before the card 200 is scanned, check whether the background values in the scanning channel 72 conform to the preset values by virtue of the upper image sensing element 50 and the lower image sensing element 40, if the background values in the scanning channel 72 conform to the preset values, execute step seven, if the background values in the scanning channel 72 are discrepant with the preset values, execute step three. That the background values in the scanning channel 72 conform to the preset values denote the card 200 is without being remained in the scanning channel 72. That the background values in the scanning channel 72 are discrepant with the preset values denote the card 200 is remained in or projects into the scanning channel 72.

Step three: drive the card 200 to move a distance Y by virtue of the two groups of the rollers 30 rotating, execute step four.

Step four: check whether the background values in the scanning channel 72 conform to the preset values by virtue of the upper image sensing element 50 and the lower image sensing element 40, if the background values in the scanning channel 72 conform to the preset values, that the card 200 has been taken away from the scanning channel 72 is denoted, and execute step the step seven, if the background values in the scanning channel 72 are discrepant with the preset values, execute step five.

Step five: preset a preset movement distance, check whether a movement distance of the card 200 or a distance of accumulated movements of the card 200 exceeds the preset movement distance, if the distance of the accumulated movements of the card 200 is without exceeding the preset movement distance, execute the step three again, if the distance of the accumulated movements of the card 200 exceeds the preset movement distance, execute step six.

Step six: displaying that the card 200 is stuck.

Step seven, stop checking and proceeding an image calibration, and execute step eight.

Step eight, start scanning the card 200 until the card 200 is completed being scanned, execute step nine.

Step nine, complete scanning the card 200 and withdraw the card 200 from the image scanning device 100.

In the step one, before the image scanning device 100 leaves the factory or after the image scanning device 100 is started up, the background values in the scanning channel 72 at the time of the card 200 being without being in the scanning channel 72 are capable of being recorded and acquired. A maximum preset value of the background values in the scanning channel 72 at the time of the card 200 being without being in the scanning channel 72 is defined as B1, and a minimum preset value of the background values in the scanning channel 72 is defined as C1.

Figure 7:
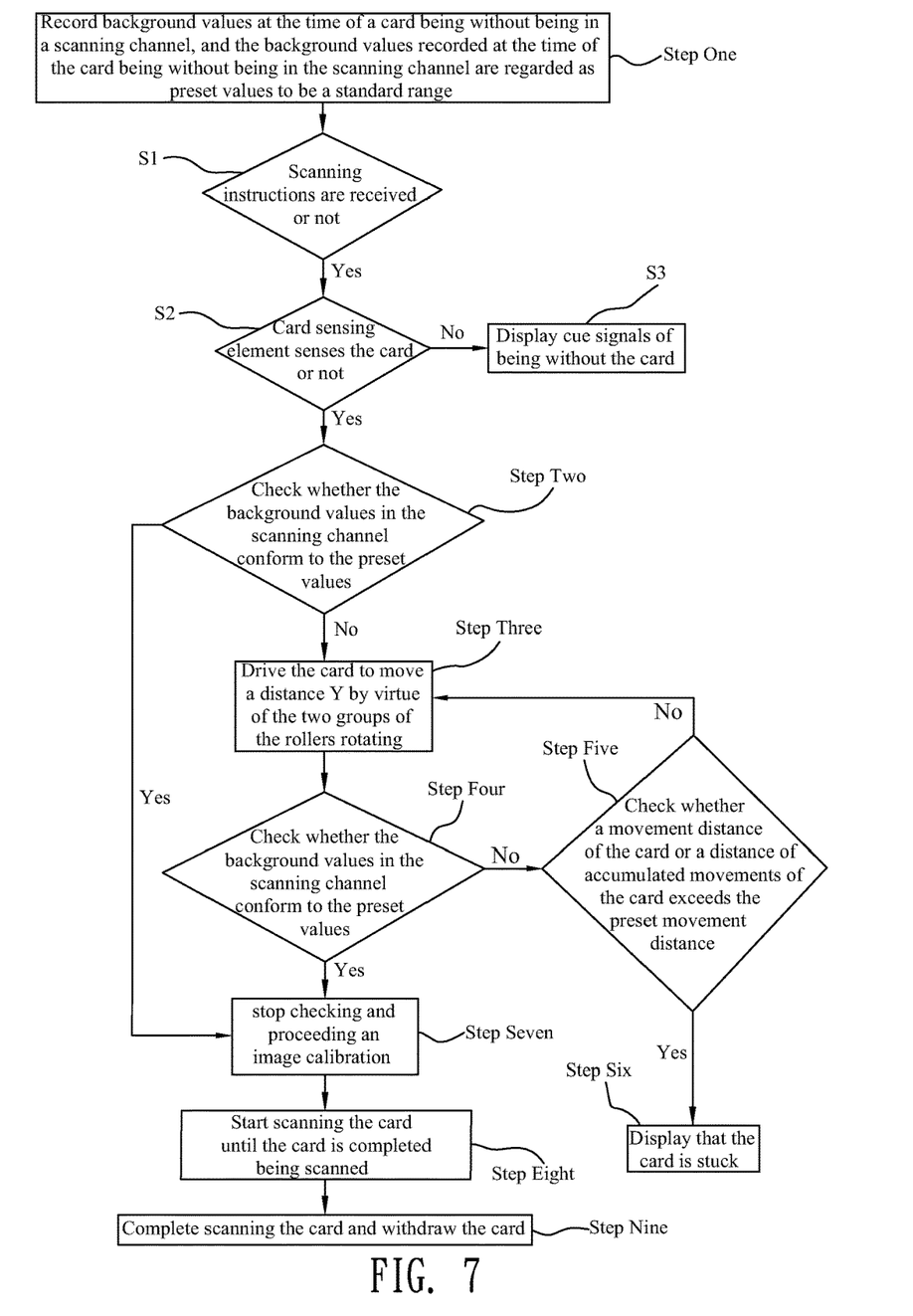
FIG. 7 is a flow diagram of the image scanning method applied in the image scanning device in accordance with the second preferred embodiment of the present invention, wherein the image scanning device in accordance with the second preferred embodiment of the present invention proceeds scanning the card by virtue of applying the image scanning method.

Referring to FIG. 1, FIG. 3 and FIG. 7, the image scanning method further includes following steps.

Step S1, after the step one is executed and the image scanning device 100 is started up, wait scanning instructions (the scanning instructions are triggered at the time of a user using the image scanning device 100), when the scanning instructions are received, execute the next step S2, when the scanning instructions are without being received, continue waiting.

Step S2, proceed sensing the card 200 by virtue of the card sensing element 60 of the image scanning device 100, when the card sensing element 60 is without sensing the card 200, execute the next step S3, when the card sensing element 60 senses the card 200, execute the step two.

Step S3, display cue signals of being without the card 200.

Figure 6:
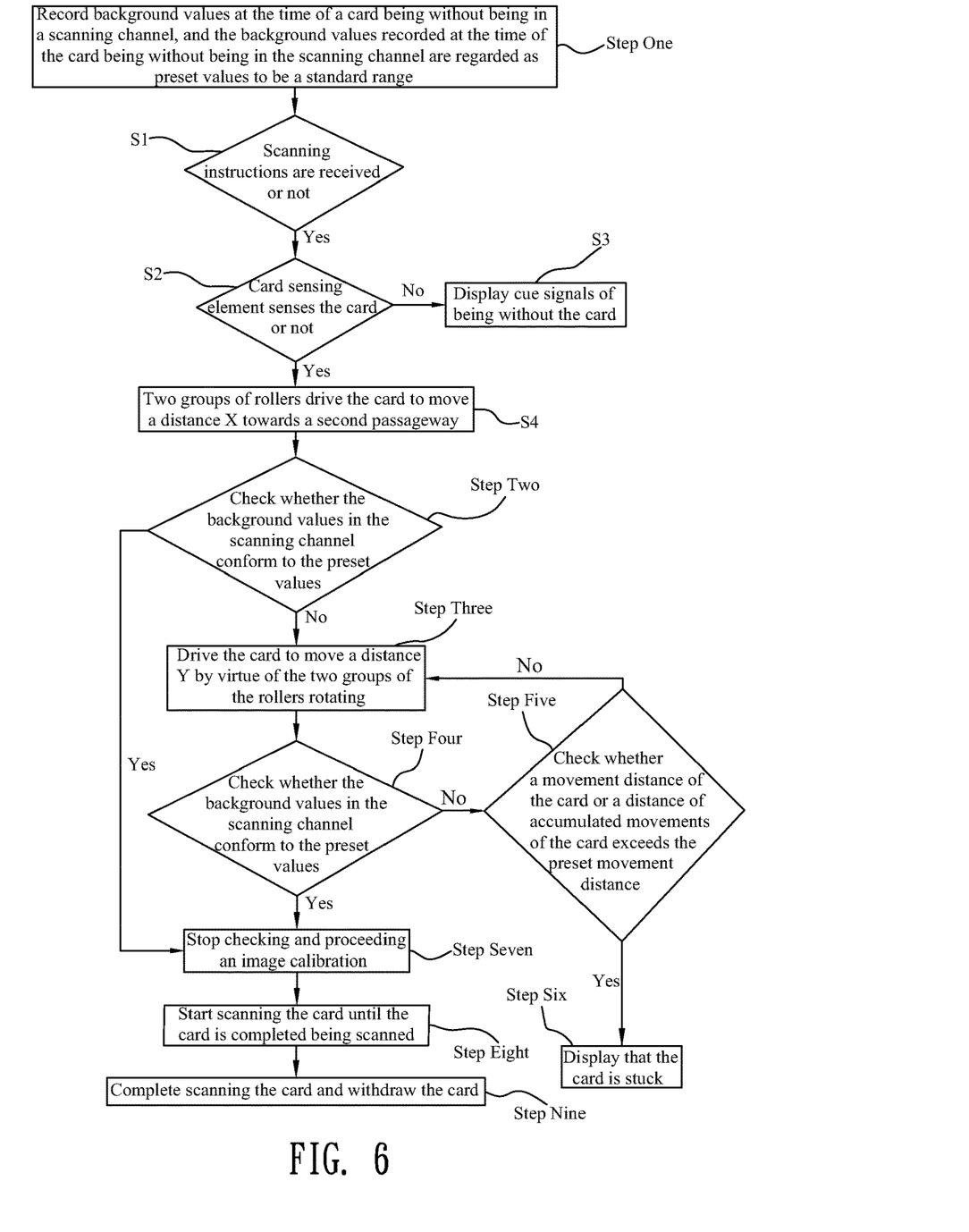
FIG. 6 is a flow diagram of the image scanning method applied in the image scanning device in accordance with the first preferred embodiment of the present invention, wherein the image scanning device in accordance with the first preferred embodiment of the present invention proceeds scanning the card by virtue of applying the image scanning method.

Referring to FIG. 1 and FIG. 6, in the first preferred embodiment, the card 200 is fed into the image scanning device 100 through the first passageway 71, and the card 200 is fed out of the image scanning device 100 from the first passageway 71. When the card sensing element 60 senses the card 200, before the step two is executed, the image scanning method further includes a step S4 described as follows: the two groups of the rollers 30 drive the card 200 to move a distance X towards the second passageway 73 of the image scanning device 100 located behind the scanning channel 72 and communicated with an outside to make the rear end of the card 200 move into the second passageway 73. So after the step S4 is executed, the step two is executed.

Figure 8:
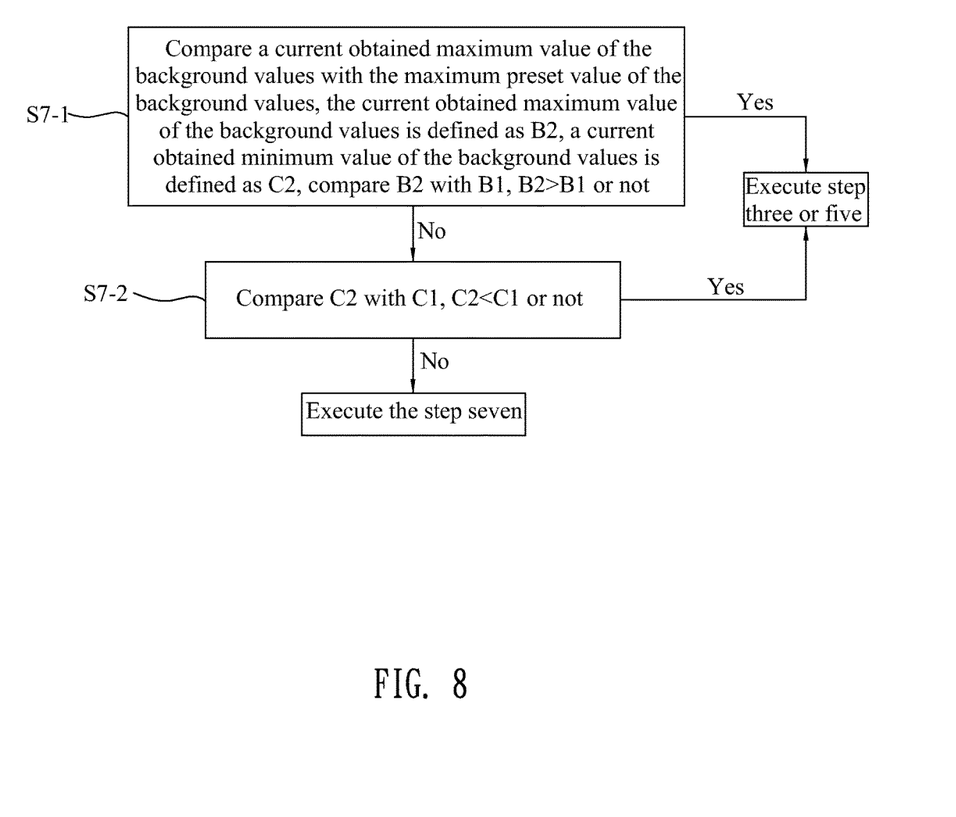
FIG. 8 is a flow diagram of an upper image sensing element and a lower image sensing element of the image scanning device in accordance with the first preferred embodiment judging whether background values in a scanning channel conform to preset values in step A2 and step A4 of the image scanning method applied in the image scanning device in accordance with the first preferred embodiment.

Referring to FIG. 1 and FIG. 8, in the first preferred embodiment, the image scanning method further includes a comparison method of the upper image sensing element 50 and the lower image sensing element 40 checking whether the background values in the scanning channel 72 conform to the preset values applied in the step two and the step four, the comparison method of the upper image sensing element 50 and the lower image sensing element 40 checking whether the background values in the scanning channel 72 conform to the preset values includes specific steps described as follows.

Step S7-1, compare a current obtained maximum value of the background values with the maximum preset value of the background values, the current obtained maximum value of the background values is defined as B2, a current obtained minimum value of the background values is defined as C2, compare B2 with B1, if B2>B1, execute the step three (corresponding to the step two) or the step five (corresponding to the step four), on the contrary, execute the next step S7-2.

Step S7-2, compare C2 with C 1, if C2<C1, execute the step three (corresponding to the step two) or the step five (corresponding to the step four), on the contrary, execute the step seven.

Figure 9:
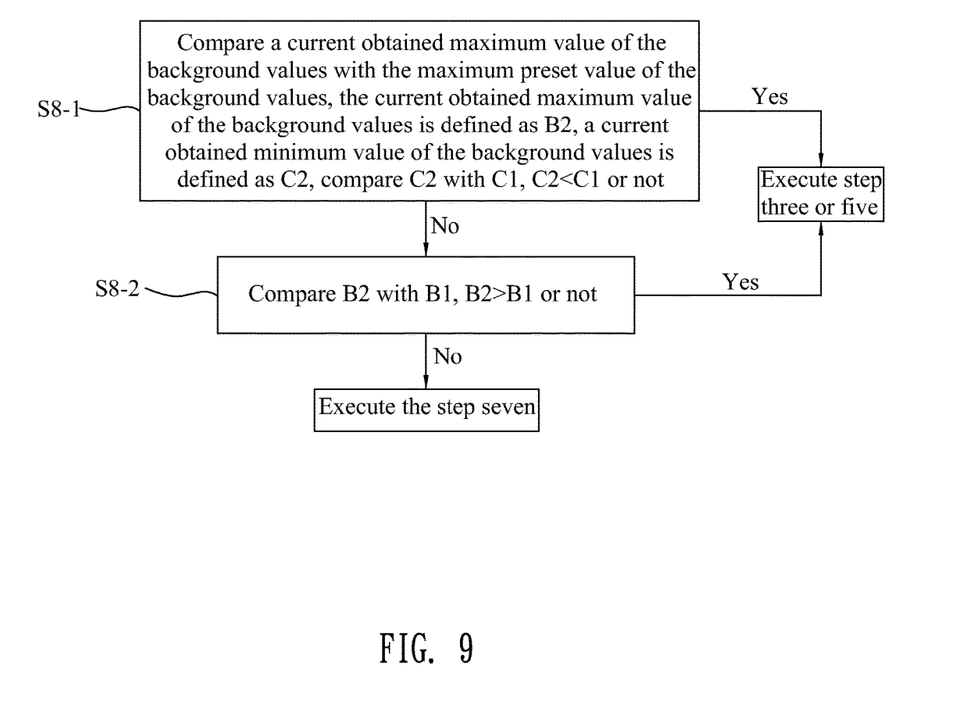
FIG. 9 is a flow diagram of the upper image sensing element and the lower image sensing element of the image scanning device in accordance with the second preferred embodiment judging whether the background values in the scanning channel conform to the preset values in the step A2 and the step A4 of the image scanning method applied in the image scanning device in accordance with the second preferred embodiment.

Referring to FIG. 1 and FIG. 9, in the second preferred embodiment, in the step two and the step four, the method of the upper image sensing element 50 and the lower image sensing element 40 checking whether the background values in the scanning channel 72 conform to the preset values includes specific steps described as follows.

Step S8-1, compare a current obtained maximum value of the background values with the maximum preset value of the background values, the current obtained maximum value of the background values is defined as B2, the current obtained minimum value of the background values is defined as C2, compare C2 with C1, if C2<C1, execute the step three (corresponding to the step two) or the step five (corresponding to the step four), on the contrary, execute the next step S8-2.

Step S8-2, compare B2 with B1, if B2>B1, execute the step three (corresponding to the step two) or the step five (corresponding to the step four), on the contrary, execute the step seven.

Referring to FIG. 1, FIG. 3, FIG. 4, FIG. 6 and FIG. 7, the distance Y is 1MM. The preset movement distance is 10MM, namely repeat the step three for ten times. Differences between the image scanning method applied in the image scanning device 100 in accordance with the first preferred embodiment and the image scanning method applied in the image scanning device 100 in accordance with the second preferred embodiment are described as follows. The image scanning method applied in the image scanning device 100 in accordance with the first preferred embodiment includes the step S4. The image scanning method applied in the image scanning device 100 in accordance with the second preferred embodiment excludes the step S4. In the first preferred embodiment, before the image scanning device 100 scans the card 200, the two groups of the rollers 30 drive the card 200 to move a distance X towards the second passageway 73 to make the rear end of the card 200 move to the second passageway 73. In the second preferred embodiment, before the image scanning device 100 scans the card 200, the card 200 is remained in the first passageway 71. In addition, in the process of moving the distance Y, in the first preferred embodiment, the second rollers 32 drive the card 200 to move towards a front area in front of the card 200 to proceed adjusting the card 200. In the second preferred embodiment, the first rollers 31 drive the card 200 to move towards a rear area behind the card 200 to proceed adjusting the card 200.

As described above, the image scanning device 100 applying the image scanning method checks whether the background values in the scanning channel 72 conform to the preset values by virtue of the upper image sensing element 50 and the lower image sensing element 40, namely the image scanning device 100 applying the image scanning method checks whether the card 200 is in the scanning channel 72, when the card 200 is in the scanning channel 72, signals are sent to the at least one motor 80, and the at least one motor 80 controls the two groups of rollers 30 to rotate to drive the card 200 away from the scanning channel 72, so that the card 200 is ensured to be incapable of projecting into the scanning channel 72, and the card 200 never shields the scanning read line 74, the card 200 is scanned completely and scanning quality of the image scanning device 100 applying the image scanning method to scan the card 200 is better. Furthermore, the image scanning device 100 just needs the single card sensing element 60, comparing with the first current image scanning device 100' and the second current image scanning device 300' in prior art, the image scanning device 100 applying the image scanning method has a lower manufacturing cost and better scanning quality.

What is claimed is:

1. An image scanning method applied in an image scanning device capable of scanning a card, the image scanning device including two groups of rollers capable of rotating clockwise and anticlockwise, a lower image sensing element, and an upper image sensing element opposite to the lower image sensing element, a scanning channel being formed between the upper image sensing element and the lower image sensing element, the image scanning method comprising steps of:

step one: recording background values at the time of the card being without being in the scanning channel, and the background values recorded at the time of the card being without being in the scanning channel being regarded as preset values to be a standard range;

step two: before the card is scanned, checking whether the background values in the scanning channel conform to the preset values by virtue of the upper image sensing element and the lower image sensing element, if the background values in the scanning channel conform to the preset values, executing step five, if the background values in the scanning channel are discrepant with the preset values, executing step three;

step three: driving the card to move a distance Y by virtue of the two groups of the rollers rotating, executing step four;

step four: checking whether the background values in the scanning channel conform to the preset values by virtue of the upper image sensing element and the lower image sensing element, if the background values in the scanning channel conform to the preset values, that the card has been taken away from the scanning channel being denoted, and executing step seven, if the background values in the scanning channel are discrepant with the preset values, executing step five;

step five: presetting a preset movement distance, checking whether a movement distance of the card or a distance of accumulated movements of the card exceeds the preset movement distance, if the distance of the accumulated movements of the card is without exceeding the preset movement distance, executing step three again, if the distance of the accumulated movements of the card exceed the preset movement distance, executing step six;

step six: displaying that the card is stuck;

step seven: stopping checking and proceeding an image calibration, and executing step eight;

step eight: starting scanning the card until the card is completed being scanned, executing step nine; and step nine: completing scanning the card and withdrawing the card from the image scanning device.

2. The image scanning method as claimed in claim 1, wherein in the step one, before the image scanning device leaves the factory or after the image scanning device is started up, the recorded background values in the scanning channel at the time of the card being without being in the scanning channel are capable of being acquired.

3. The image scanning method as claimed in claim 1, further comprising the steps of:

after the step one is executed and the image scanning device is started up, waiting scanning instructions, when the scanning instructions are received, executing the next step, when the scanning instructions are without being received, continuing waiting;

proceeding sensing the card by virtue of a card sensing element which is mounted in a first passageway of the image scanning device located in front of the scanning channel, when the card sensing element is without sensing the card, executing the next step, when the card sensing element senses the card, executing the step two; and displaying cue signals of being without the card.

4. The image scanning method as claimed in claim 3, wherein when the card sensing element senses the card, before the step two is executed, the two groups of the rollers drive the card to move a distance X towards a second passageway of the image scanning device located behind the scanning channel and communicated with an outside to make a rear end of the card move into the second passageway.

5. The image scanning method as claimed in claim 1, further comprising a comparison method of the upper image sensing element and the lower image sensing element checking whether the background values in the scanning channel conform to the preset values applied in the step two and the step four, a maximum preset value of the background values in the scanning channel at the time of the card being without being in the scanning channel being defined as B1, and a minimum preset value of the background values in the scanning channel being defined as C1, the comparison method comprising the steps of:

comparing a current obtained maximum value of the background values with the maximum preset value of the background values, the current obtained maximum value of the background values being defined as B2, a current obtained minimum value of the background values being defined as C2, comparing B2 with B1, if B2>B1, executing the step three or the step five, on the contrary, executing the next step; and comparing C2 with C1, if C2<C1, executing the step three or the step five, on the contrary, executing the step seven.

6. The image scanning method as claimed in claim 1, further comprising a comparison method of the upper image sensing element and the lower image sensing element checking whether the background values in the scanning channel conform to the preset values applied in the step two and the step four, a maximum preset value of the background values in the scanning channel at the time of the card being without being in the scanning channel being defined as B1, and a minimum preset value of the background values in the scanning channel being defined as C1, the comparison method comprising the steps of:

comparing a current obtained maximum value of the background values with the maximum preset value of the background values, the current obtained maximum value of the background values being defined as B2, the current obtained minimum value of the background values being defined as C2, comparing C2 with C1, if C2<C1, executing the step three or the step five, on the contrary, executing the next step; and comparing B2 with B1, if B2>B1, executing the step three or the step five, on the contrary, executing the step seven.

7. The image scanning method as claimed in claim 1, wherein the distance Y is 1 MM.

8. The image scanning method as claimed in claim 1, wherein the preset movement distance is 10 MM.

* * * * *